(12) United States Patent
Quader et al.

(10) Patent No.: US 11,500,830 B2
(45) Date of Patent: Nov. 15, 2022

(54) LEARNING-BASED WORKLOAD RESOURCE OPTIMIZATION FOR DATABASE MANAGEMENT SYSTEMS

(71) Applicant: INTERNATIONAL BUSINESS MACHINES CORPORATION, Armonk, NY (US)

(72) Inventors: Shaikh Shahriar Quader, Scarborough (CA); Nicolas Andres Jaramillo Duran, Toronto (CA); Sumona Mukhopadhyay, North York (CA); Emmanouil Papangelis, Toronto (CA); Marin Litoiu, Toronto (CA); David Kalmuk, Markham (CA); Piotr Mierzejewski, Markham (CA)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 16/949,139

(22) Filed: Oct. 15, 2020

(65) Prior Publication Data
US 2022/0121633 A1 Apr. 21, 2022

(51) Int. Cl.
*G06F 16/21* (2019.01)
*G06F 16/245* (2019.01)
(Continued)

(52) U.S. Cl.
CPC .......... *G06F 16/213* (2019.01); *G06F 16/217* (2019.01); *G06F 16/24545* (2019.01);
(Continued)

(58) Field of Classification Search
CPC .... G06F 16/213; G06F 16/217; G06F 16/285; G06F 16/24545; G06N 3/08; G06N 5/04
See application file for complete search history.

(56) References Cited

U.S. PATENT DOCUMENTS

| 5,793,888 A | * | 8/1998 | Delanoy | ............ G06F 16/5838 |
| | | | | 707/E17.023 |
| 10,713,092 B2 | | 7/2020 | Gupta | |

(Continued)

FOREIGN PATENT DOCUMENTS

CN 107908794 A 4/2018

OTHER PUBLICATIONS

Jain, Shrainik, et al. "Query2vec: An evaluation of NLP techniques for generalized workload analytics." arXiv preprint arXiv: 1801. 05613 (2018). (Year: 2018).*

(Continued)

*Primary Examiner* — Son T Hoang
(74) *Attorney, Agent, or Firm* — Schmeiser, Olsen & Watts, LLP; Stephanie Carusillo

(57) ABSTRACT

A DBMS training subsystem trains a DBMS workload-manager model with training data identifying resources used to execute previous DBMS data-access requests. The subsystem integrates each request's high-level features and compile-time operations into a vector and clusters similar vectors into templates. The requests are divided into workloads each represented by a training histogram that describes the distribution of templates associated with the workload and identifies the total amounts and types of resources consumed when executing the entire workload. The resulting knowledge is used to train the model to predict production resource requirements by: i) organizing production queries into candidate workloads; ii) deriving for each candidate a histogram similar in form and function to the training histograms; iii) using the newly derived histograms to predict each candidate's resource requirements; iv) selecting the candidate with the greatest resource requirements capable of being satisfied with available resources; and v) executing the selected workload.

25 Claims, 7 Drawing Sheets

(51) Int. Cl.
  *G06F 16/28* (2019.01)
  *G06F 16/2453* (2019.01)
  *G06N 5/04* (2006.01)
  *G06N 3/08* (2006.01)

(52) U.S. Cl.
  CPC ............. *G06F 16/285* (2019.01); *G06N 3/08* (2013.01); *G06N 5/04* (2013.01)

(56) References Cited

U.S. PATENT DOCUMENTS

| | | | |
|---|---|---|---|
| 2004/0225631 | A1 | 11/2004 | Elnaffar |
| 2009/0089252 | A1* | 4/2009 | Galitsky ................ G06F 16/332 |
| 2010/0082602 | A1* | 4/2010 | Ganapathi ......... G06F 16/24545 |
| | | | 707/718 |
| 2011/0196857 | A1 | 8/2011 | Chen |
| 2013/0318069 | A1* | 11/2013 | Alu ................... G06F 16/24524 |
| | | | 707/718 |
| 2016/0328273 | A1 | 11/2016 | Molka |
| 2018/0082183 | A1 | 3/2018 | Hertz |
| 2018/0314735 | A1* | 11/2018 | Liu ................... G06F 16/24532 |
| 2019/0102553 | A1* | 4/2019 | Herwadkar ........... G06F 21/566 |
| 2019/0370235 | A1* | 12/2019 | Yang ........................ G06N 3/08 |
| 2020/0210387 | A1 | 7/2020 | Brown |
| 2020/0233869 | A1 | 7/2020 | Gawande |
| 2021/0357835 | A1* | 11/2021 | Modi ...................... G06F 16/26 |
| 2021/0406717 | A1* | 12/2021 | Tauheed .............. G06F 16/2282 |

OTHER PUBLICATIONS

Mell, Peter et al.; "The NIST Definition of Cloud Computing;" National Institute of Standards and Technology; Special Publication 800-145; Sep. 2011; 7 pages.

Ganapathi, Archana et al; Predicting Multiple Metrics for Queries—Better Decisions Enabled by Machine Learning; 2009 IEEE 25th International Conference on Data Engineering; Mar. 29-Apr. 2, 2009; 12 pages.

Jain, Shrainik et al.; Query2Vec: An Evaluation of NLP Techniques for Generalized Workload Analytics; 44th International Conference on Very Large Data Bases; Aug. 2018; 14 pages.

Kraska, Tim et al; The Case for Learned Index Structures; Proceedings of the 2018 International Conference on Management of Data; May 2018; pp. 489-504.

Kul, Gokhan et al.; Similarity Metrics for SQL Query Clustering; IEEE Transactions on Knowledge and Data Engineering, vol. 30, Issue 12; Dec. 1, 2018; 15 pages.

Li, Guoliang et al; QTune: A QueryAware Database Tuning System with Deep Reinforcement Learning; Proceedings of the VLDB Endowment, vol. 12, No. 12; Aug. 2019; pp. 2118-2130.

Liu, Henry et al; Cardinality estimation using neural networks; Proceedings of the 25th Annual International Conference on Computer Science and Software Engineering; Nov. 2015; pp. 53-59.

Ma, Lin et al; Query-based Workload Forecasting for Self-Driving Database Management Systems; 2018 International Conference on Management Systems; Jun. 10-15, 2018; 15 pages.

Notification of Transmittal of the International Search Report and the Written Opinion of the International Searching Authority, of the Declaration; dated Jan. 13, 2022; International Application No. PCT/IB2021/058735; Filing Date Sep. 24, 2021; 10 pages.

\* cited by examiner

LEARNING-BASED WORKLOAD RESOURCE OPTIMIZATION FOR DATABASE MANAGEMENT SYSTEMS

BACKGROUND

The present invention relates in general to database-management systems (DBMSs) and in particular to the prediction or estimation of resource requirements incurred by the execution of database queries.

A DBMS's current workload is a set of data-access requests (such as Structured Query Language (SQL) queries) that seek to either analyze or revise the contents of a database currently being processing by the DBMS. DBMS workloads can require very different amounts and types of resources, with each workload requiring a particular combination, and specific amounts, of computer memory, CPU cycles, I/O bandwidth, secondary storage, and other resources.

A DBMS runs more efficiently if it is able to accurately predict the types and amounts of resources required to process each workload statement. Because a workload query or other type of data-access request does not explicitly identify the resources it consumes, known DBMSs can at best guess resource requirements by applying generalized, static rules of thumb to each query.

Such rules generally consider only the express language of each query statement, often forcing a DBMS to extract low-level features extracted from each workload statement and to then apply a specific resource-estimation model to each parsed feature. For example, one rule might be tailored to predict the resources required to process SQL GROUP BY predicates. When receiving a query containing a GROUP BY predicate, the DBMS would parse the query to identify several dozen database operations required to process the query's GROUP BY function.

The DBMS would then apply a distinct estimation model to analyze each combination of extracted low-level feature and resource type to guess the resource requirements incurred by processing that feature. The DBMS would then predict the total requirements of the GROUP BY predicate by aggregating its resource-consumption estimates for each low-level feature. This process would be repeated for each resource-consuming operation or predicate of the query in order to estimate the resource requirements of the entire query.

SUMMARY

Embodiments of the present invention comprise systems, methods, and computer program products for a self-learning database-management system (DBMS). These embodiments include an expert workload-manager component and a training subsystem that uses machine-learning technology to train a cognitive model to estimate resource requirements of entire batches of queries or other types of data-access requests.

In a first class of "training mode" embodiments, a training subsystem of the DBMS submits to the workload-management model training data that identifies the amounts and types of resources previously used by the DBMS when servicing prior data-access requests. The system identifies various high-level features of each request, such as tokens parsed from the text of a request, as wells as metrics and compile-time operations referenced by an execution plan generated by the DBMS's query-optimizer component. The system packages each request's high-level features as a query vector, and the vectors are clustered into mutually exclusive subsets (or "templates") of similar vectors. The subsystem organizes the data-access requests into batched workloads, and each workload is associated with a histogram that represents the distribution of templates associated with the batch of data-access requests that make up the workload. Because the training data identifies the amounts and types of resources that were incurred by the prior execution of each request, in some embodiments, the histogram is also associated with a set of resource requirements specifying the amounts and types of resources that were required to service the histogram's corresponding workload.

In other embodiments, each workload is associated with multiple histograms. In such embodiments, the set of resource requirements associated with each histogram specifies the amounts of only one of the types of resources that were required to service the histogram's corresponding workload.

In either case, this knowledge is then formatted into the form of a machine-learning corpus—such as a triple-store data structure that represents concepts, rules, and dependencies that comprise artificial-intelligence "knowledge" as a set of 3-tuple vectors—and used to train the model. During production, a fully trained model, in response to receiving a histogram that represents the distribution of templates associated with all requests in one production workload, will then be able to predict, as a sole function of the received histogram, the aggregated costs of executing the entire production workload.

In a second class of "production mode" embodiments, a production DBMS, in conjunction with the trained model, applies knowledge derived by a training-mode embodiment to estimate resources that will be required to execute batches of incoming data-access requests. The DBMS, in a manner similar to that performed during the training mode, associates each incoming request with a query vector that is then allocated to one of the previously generated templates. The DBMS builds a series of candidate workloads by adding the incoming requests one at a time to create increasingly resource-intensive workloads. As in the training phase, each candidate workload is associated with a histogram that identifies the distribution of templates among statements that make up the workload. As each new candidate workload is generated, the DBMS sends the workload's corresponding histogram or histograms to the trained model. In response, the model, based on the model's previous training, predicts the workload's resource requirements. This process continues until the candidate workload's requirements become too large to be satisfied by currently available resources. The next-largest workload is then deemed to be the largest workload that can be executed with available resources, and that workload is forwarded to the DBMS's query-execution engine for further processing.

DETAILED DESCRIPTION

Figure 1:
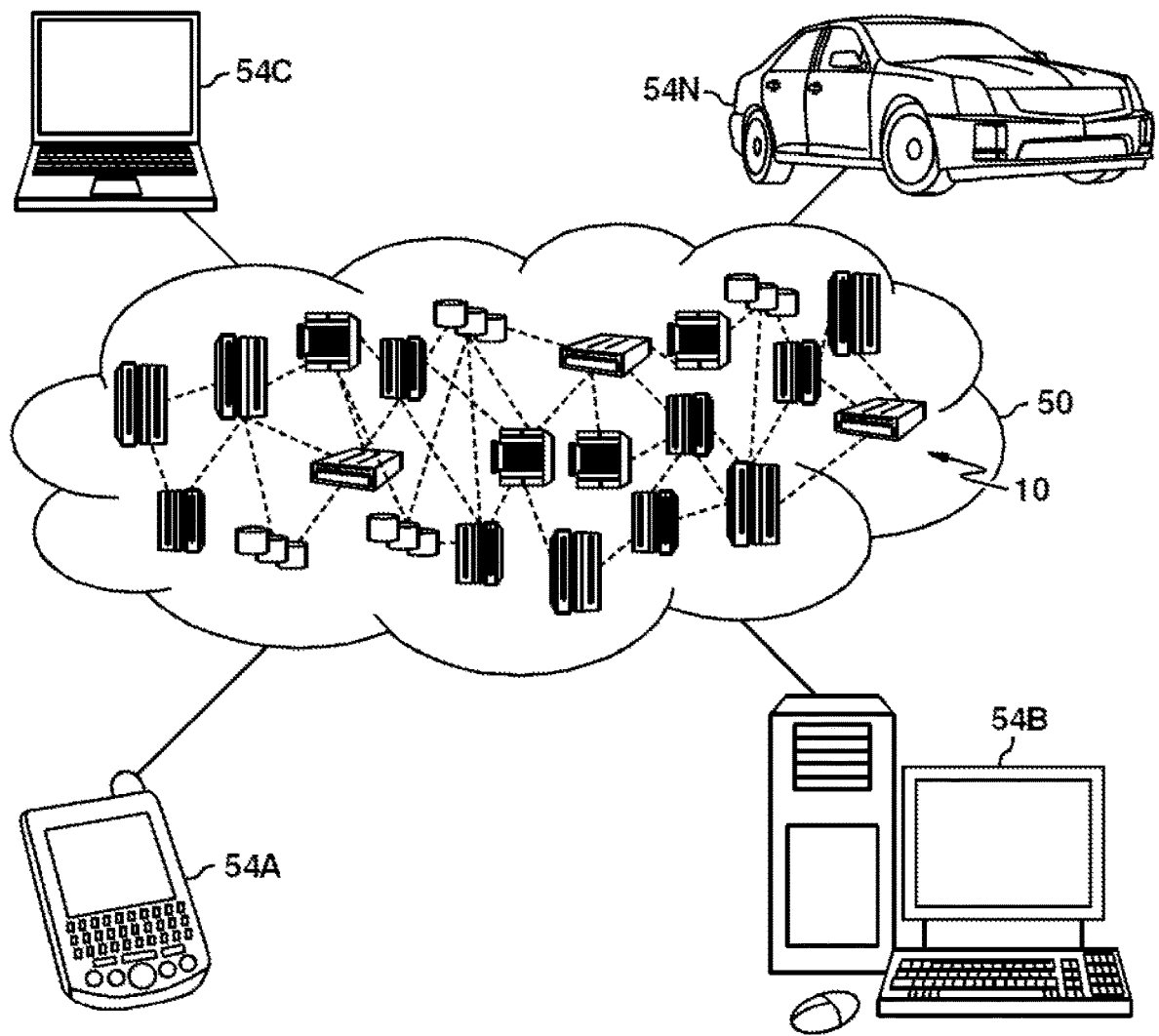
FIG. 1 depicts a cloud computing environment according to an embodiment of the present invention.

Known methods of estimating DBMS resource requirements employ relatively unsophisticated workload-management mechanisms that must extract low-level features from individual data-access statements and then associate each extracted feature with a corresponding set of requirements. These mechanisms do not account for more nuanced factors related to the concurrent processing of multiple statements in a workload and do not provide the flexibility and robustness required to run without maintenance by a human database administrator.

Known DBMS workload-manager technologies also suffer from complexity and overhead incurred by their need to use a distinct resource-consumption model to analyze each possible combination of low-level feature and resource type. Known implementations also require continuous monitoring and maintenance in order to manually revise these models whenever there are changes to a DBMS application, a database schema, a computing platform, or the general composition or timing of submitted workloads.

Embodiments of the present invention provide methods, systems, and computer program products that improve the workload-management subsystems and technologies employed by known DBMSs. These improvements include a self-learning workload-management function or component containing a cognitive model that is trained to predict resource requirements at the workload level. Unlike existing DBMS workload managers that try to guess requirements for one statement at a time, the present invention uses a top-down approach that estimates resource requirements for entire workloads.

In general, a top-down estimation model is simpler to implement than a bottom-up model that must analyze the resource requirements of every low-level query feature. However, top-down models are, in general, less accurate because such models have access to less information when generating resource estimates for individual query statements.

The present invention solves this problem by analyzing the resource requirements of entire workload batches of query statements, rather than by merely parsing isolated queries. Because a workload can contain a large number of heterogeneous data-access statements that compete for a variety of resources, embodiments estimate resource requirements as a function of specific high-level features characteristic of an entire workloads.

In this document, the terms "data-access requests," "database-access requests, "data-access requests," "database queries," "data-access statements," and similar terms will at times be used interchangeably to refer to instructions, received by a DBMS, that request additions to, deletions from, updates to, and retrieval of, data elements, indexes, and other contents of a database. Although certain definitions of the terms could, for example, distinguish a "query" from a "statement"—as, for example, when a SQL query is defined as being composed of multiple statements—such distinctions are not germane to the form or function of the present invention. Various embodiments, depending on implementer preferences and technical considerations, can be configured to use identical steps to process individual SQL statements, entire queries, or other types of data-access requests.

These characteristics run the gamut from syntactical elements like Structured Query Language (SQL) operators, semantically meaningful identifiers like table, column, and sub-schema aliases, and features of query-execution plans generated by a DBMS's optimizer module. Certain embodiments implement at least part of these analytical steps as a distribution-regression learning problem that generates vector data structures capable of being submitted to deep-learning neural networks or incorporated into a machine-learning corpus of training data. When placed into production, an improved workload manager that has been trained by the embodiment's top-down, batch-oriented methodology, can more accurately determine whether adding a single query to an existing DBMS workload would overallocate a limited resource.

Embodiments of the present invention also improve known DBMS workload-management components by freeing the DBMS from the need to extract and analyze each low-level feature of each query statement. Embodiments thus do not require a distinct resource-estimation model to analyze each type of low-level feature and query operator or predicate. And because the present invention intelligently learns with experience which resource-consumption predictions are most accurate or produce the greatest performance improvements, embodiments do not necessarily have to be manually reconfigured when there is a change in a database schema, an application or computing platform configuration, or the overall timing or composition of workloads submitted to the DBMS.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
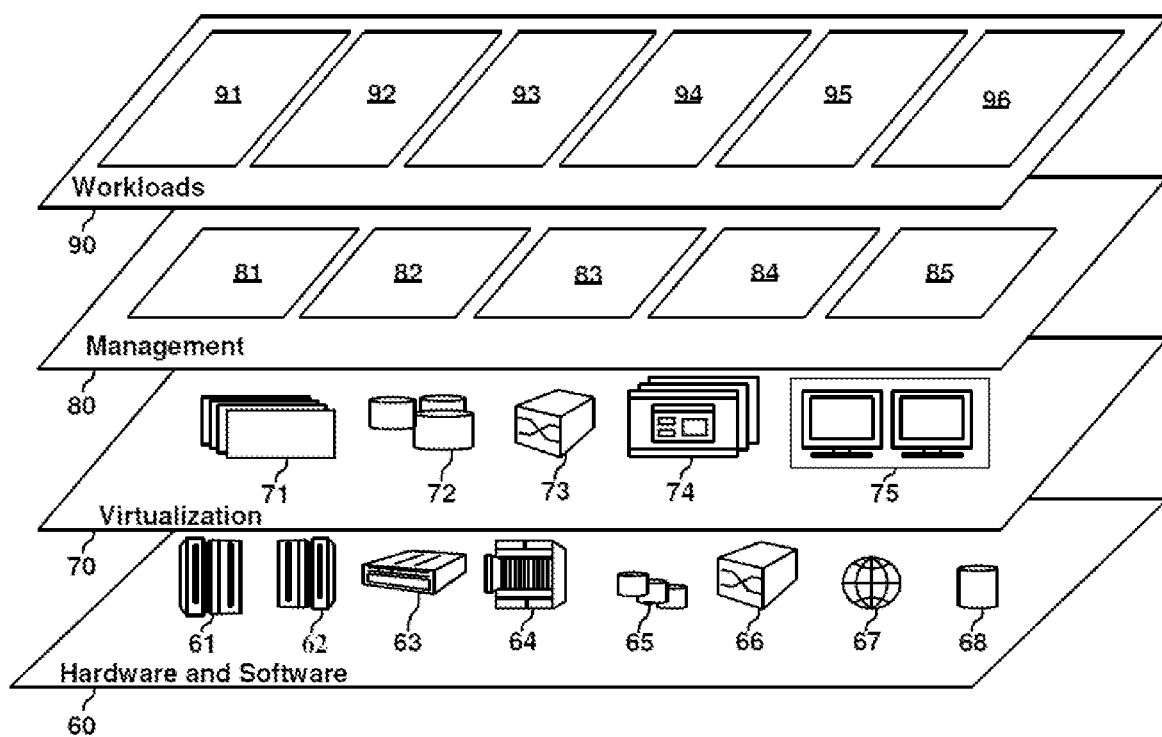
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of optimized resource-requirement estimation for batched workloads of database management systems.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
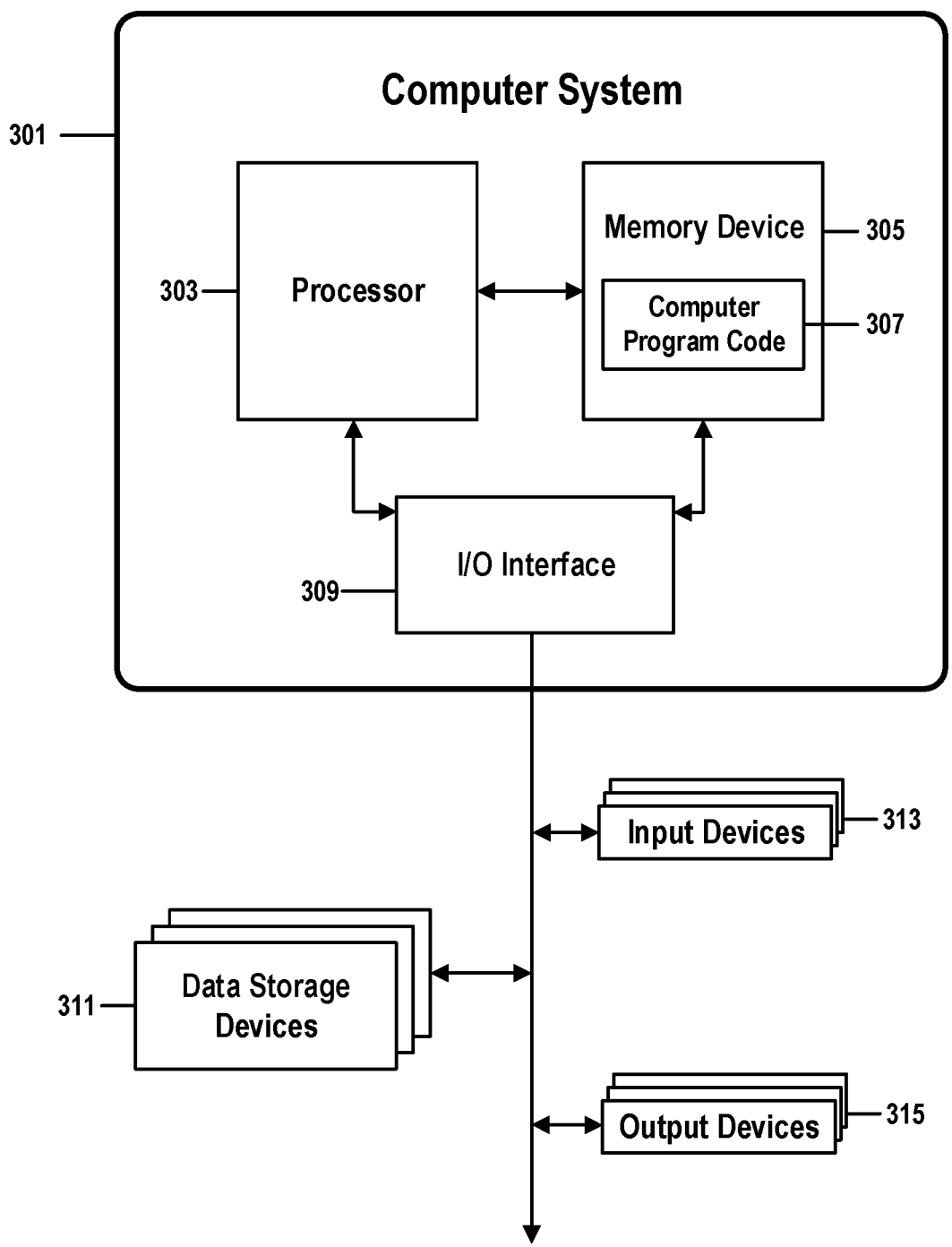
FIG. 3 shows the structure of a computer system and computer program code that may be used to implement a method for self-learning binned resource optimization for database management systems, in accordance with embodiments of the present invention.

FIG. 3 shows a structure of a computer system and computer program code that may be used to implement a method for self-learning binned resource optimization for database management systems in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for self-learning binned resource optimization for database management systems in accordance with embodiments of the present invention, and may implement other embodiments described in this specification, including the methods illustrated in FIGS. 1-7. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware, or may be accessed by processor 303 directly from such firmware, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for self-learning binned resource optimization for database management systems.

Any of the components of the present invention could be created, integrated, hosted, maintained, deployed, managed, serviced, supported, etc. by a service provider who offers to facilitate a method for self-learning binned resource optimization for database management systems. Thus the present invention discloses a process for deploying or integrating computing infrastructure, comprising integrating computer-readable code into the computer system 301, wherein the code in combination with the computer system 301 is capable of performing a method for self-learning binned resource optimization for database management systems.

One or more data storage devices 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for self-learning binned resource optimization for DBMSs may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for self-learning binned resource optimization for DBMSs is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
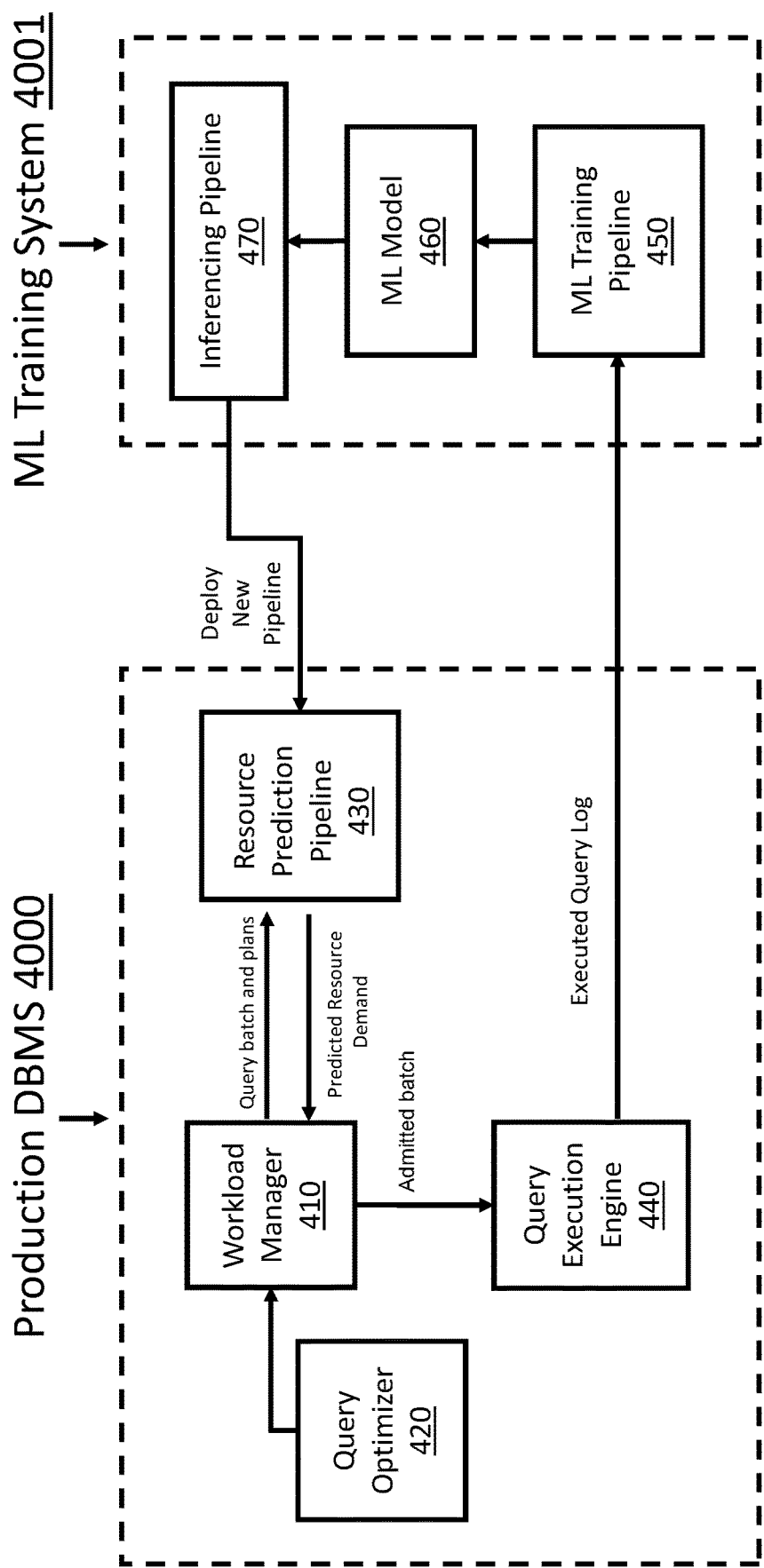
FIG. 4 shows the architecture of a self-learning workload-management component of a database-management system and related components, in accordance with embodiments of the present invention.

FIG. 4 shows the architecture of a self-learning workload-management component of a DBMS and related components, in accordance with embodiments of the present invention. FIG. 4 shows items 410-470 and 4000-4001.

In embodiments of FIG. 4, self-learning workload-management component 410 of DBMS 4000 is trained by a machine-learning training subsystem 4001 to more accurately predict resource requirements of incoming data-access requests by organizing and servicing those requests as batched workloads.

The figure shows a subset of components of DBMS 4000:
 improved workload manager 410, relying upon a machine-learning model 460 trained by embodiments of the present invention, predicts resource requirements of production workloads submitted to the DBMS 4000. In some embodiments a distinct machine-learning model 460 will be used to predict requirement for one (or another proper subset) of all possible types or classes of resource. In such cases, each model 460 is independently trained, through repetitions of the methods of FIGS. 4-5, to predict a production workload's requirements for the particular model's associated resource or resources, and the total resource requirements of a production workload are derived by aggregating the requirements identified by each model 460;
 query optimizer 420, as is known in the art, generates execution plans for incoming SQL queries and other types of data-access requests;
 resource prediction pipeline 430 transfers to workload manager 410 resource-prediction rules, concepts, inferences, and other training and artificially intelligent knowledge comprised by the resource-requirement estimation model 460 trained by training system 4001; and
 query execution engine 440, as is known in the art, manages the DBMS's execution of each statement of production DBMS workloads assembled by workload manager 410.

The machine-learning training system 4001, employing methods of artificial intelligence, cognitive computing, or machine-learning, trains the self-learning model 460 that predicts resource requirements of submitted DBMS workloads. Training system 4001 includes the components:
 machine-learning training pipeline 450, which receives from DBMS 4000 raw training data in the form of query logs that identify the types and quantities of resources required to service data-access requests previously submitted to the DBMS;
 machine-learning model 460, which is trained by training system 4001 to predict resource requirements of incoming DBMS statements that have been batched into workloads; and
 inferencing pipeline 470, which interfaces components that perform various preprocessing steps, dictionary generation, and general modeling operations (as described in subsequent figures), and transfers the resulting artificially intelligent inferences, concepts, and rules from the machine-learning model 460 to production DBMS 4000.

Some embodiments may comprise architecture that is slightly different than that of FIG. 4, that partitions functionality of a particular component into multiple components, or that combines the functionality of two or more components into a single component. For example, the training system 4001 may in some implementations be an internal component of DBMS 4000, or both DBMS 4000 and training system 4001 may be components of a single larger system.

As will be discussed in greater detail in subsequent figures, embodiments of the present invention may be deployed on the platform of FIG. 4 to perform steps following the general procedure:

i) In a training phase, resource-requirement estimation model 460 is trained to estimate resource requirements of various workloads processed by DBMS 4000. During this phase, training system 4001 first receives a set of raw training data, such as a log of data-access requests or other types of production workloads previously submitted to DBMS 4000 or to a similar DBMS. In some embodiments, this data is received from DBMS 4000, through the training pipeline 450. The raw training data also describes the types and amounts of resources that were required by the DBMS 4000 to service each logged request.

ii) Training system 4001 processes the training data to generate a training corpus, formatted in compliance with known standards or conventions used by machine-learning applications. In some embodiments, such a corpus is formatted as the class of triple-store data structure known to be used in the art for machine-learning training. Such a corpus represents the knowledge received and generated by the training system as a type of data structure known in the art of machine learning as a way of representing training knowledge. Training system 4001 then uses the machine-learning corpus to train resource-requirement estimation model 460 to predict resource requirements of batched workloads.

iii) Rules, inferences, concepts, relations, and other components of artificially intelligent knowledge comprised by the trained model 460 pass through the inferencing pipeline 470 of training system 4001 and the resource-prediction pipeline 430 to the workload manager 410 component of DBMS 4000. In some embodiments the entire model is passed to DBMS 4000.

iv) Improved workload manager 410, using the latest knowledge or model received from training system 4001, and in response to execution plans generated by query optimizer 420, estimates resource requirements of production workloads assembled from data-access requests submitted to DBMS 4000. Workload manager 410 then uses this knowledge to ensure that production workloads do not require the allocation of more resources than are currently available to DBMS 4000 and to further help ensure that the DBMS utilizes available resources in an optimal manner. Both types of improvements help maximize the DBMS's throughput and performance.

Figure 5:
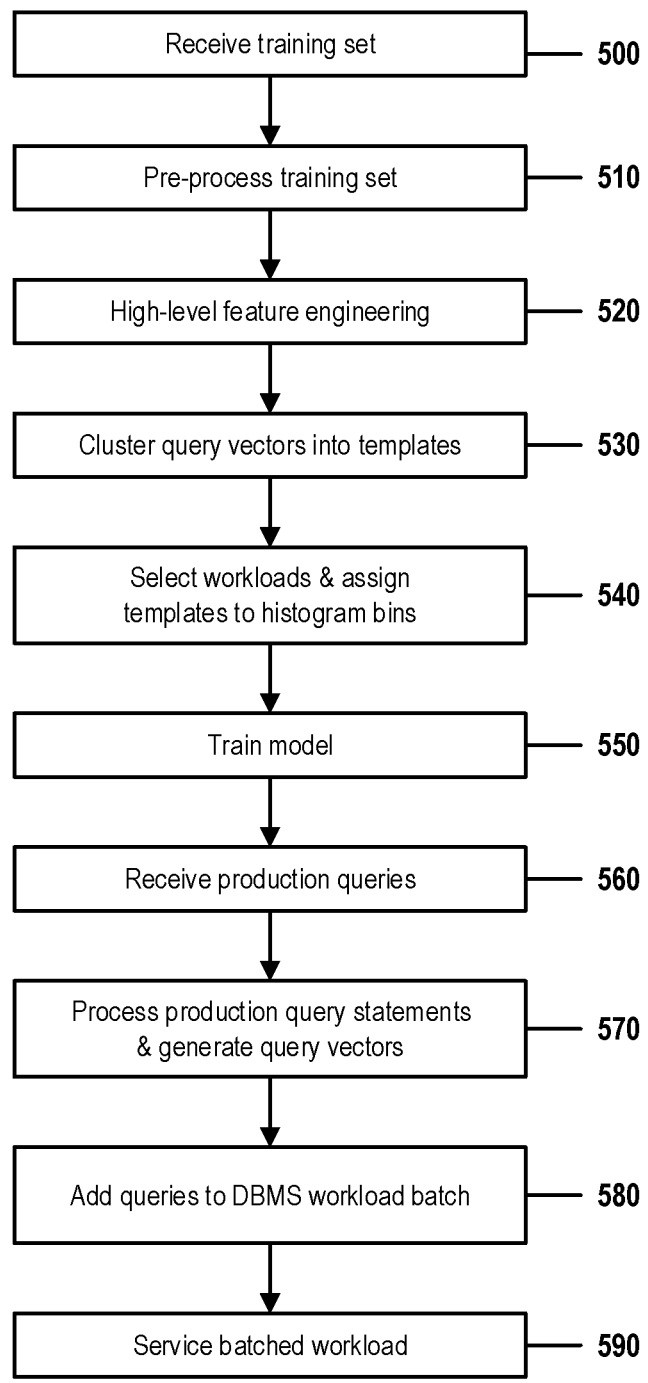
FIG. 5 is a high-level flow chart that illustrates methods, in accordance with embodiments of the present invention, for training a self-learning DBMS workload manager to perform binned resource optimization and then using the results of that training to optimize the estimation of resource requirements in a production environment.

FIG. 5 is a high-level flow chart that illustrates methods, in accordance with embodiments of the present invention, for training a self-learning DBMS workload manager to perform binned resource optimization and then using the results of that training to optimize the estimation of resource requirements in a production environment. FIG. 5 contains steps 500-590, which are described in greater detail in subsequent figures, and which may be performed by embodiments like those shown in FIGS. 1-4.

In step 500, training system 4001 receives a training dataset that comprises or consists of a log of SQL DBMS queries or other types of data-access requests. Depending on implementation, each request may be a single statement or may comprise multiple statements. In some embodiments, this dataset is generated by a component of production DBMS 4000 as, for example, a query log. In addition to including the actual text, or other representation, of past data-access requests, the dataset also identifies the types and amounts of resources that were consumed by the DBMS 4000 in order to service each request.

In step 510, training system 4001 preprocesses each statement of the received training dataset. This preprocessing, which is described in greater detail in FIG. 6, includes normalization and standardization operations that reduce the complexity of subsequent steps of the present invention.

In step 520, training system 4001 performs high-level feature-engineering tasks on the preprocessed training statements. These tasks, described in greater detail in FIG. 6, result in a dictionary of keywords parsed from the training statements, identify high-level compile-time features specified by query-execution plans generated by DBMS optimizer module 420 for each statement, and generates a set of query vectors that each represent this information for a corresponding training statement.

In step 530, training system 4001 organizes the query vectors into "template" clusters. Each template consists of a subset of the query vectors that have been deemed to have a degree of similarity that exceeds a predefined similarity threshold value. Any known similarity-quantifying mechanism, such as a known clustering algorithm, can be selected by an implementer to determine which query vectors have degrees of similarity sufficient enough to be assigned to the same template. This step is described in greater detail in FIG. 6. In certain embodiments, every query vector is assigned to one and only one template.

Numerous clustering and similarity-determining procedures are known in the art and, depending on an implementer's preference and on technical constraints, an embodiment may employ a particular procedure chosen from known mechanisms like a k-means clustering or DBSCAN algorithm. The present invention is flexible enough to accommodate any clustering method, or any other method known in the art for quantifying degrees of similarity between or among n-dimensional vectors.

In one example, a specific known clustering algorithm is used to determine whether a subset of vectors are sufficiently similar to be allocated to the same template. Here, that determination would comprise plotting each n-element vector as a point in n-dimensional space and measuring the distance between that the n-dimensional position and the template's centroid (or arithmetic mean) value. A degree of similarity of this vector to other vectors could then be derived as a function of the magnitude of this distance. In this example, all vectors associated with distances less than a predetermined threshold value would be deemed to be similar enough to be allocated into the same template.

At the conclusion of step 530, training system 4001 will have generated templates of query vectors, such that the query vectors contained in each template represent a subset of the training queries or statements that share similar high-level features. In some embodiments, training system 4001 may generate an additional template that is reserved for production workloads that do not correspond to any of the previously generated templates.

In step 540, training system 4001 generates a set of histograms that each describe a distribution of vectors in a particular workload of training queries. This procedure is described in greater detail in FIG. 6.

This "binning" process begins by randomly dividing the training queries (or data-access statements) into subsets of equal size. Each subset represents a random "training workload" of DBMS queries or other types of data-access requests that may be submitted to DBMS 4000. Because each training query is represented by exactly one template, but each template may represent multiple training queries, each training workload is associated with a corresponding number of instances of each template. It is possible for a training workload to be associated with zero instances of certain templates.

Each histogram comprises a set of distinct bins, and each bin is uniquely associated with one of the templates generated in step 530. The value stored in a particular bin of a particular histogram identifies the number of instances, of that particular bin's associated template, that are associated with any of the queries that make up the particular histogram's corresponding workload.

In one example, system 4001 in step 530 generates five templates: T1, T2, T3, T4, and T5. Each histogram generated in step 540 will thus have five bins, one for each template. If a training workload selected in step 540 consists of three queries that are associated, respectively, with templates T1, T5, and T1, then the five bins of that workload's histogram will each identify the number of the workload's queries associated with one of the templates. In this case, the histogram's five bins would be populated with the values: T1=2, T2=0, T3=0, T4=0, and T5=1.

Because each training query is known to have consumed a specific quantity of resources, each histogram is also associated with its own set of resource requirements. In certain embodiments, the histogram's resource requirements are derived as the sum of the requirements of each query of the training workload associated with the histogram. In some embodiments, each histogram or template is associated with requirements of only one type of resource, resulting in a particular workload's resource requirements being associated with a set of single-resource training histograms.

In step 550, training system 4001 formats the information represented by at least some of the training workloads, histograms, resource requirements, and query vectors into a formally structured machine-learning corpus. This corpus is more than a mere body of unstructured or arbitrarily structured data. Instead, the corpus contains artificial-intelligence knowledge formatted in a manner consistent with known knowledgebase data structures used in fields of artificial intelligence, such as expert systems and machine learning. In representative embodiments, this knowledge is formatted as a set of vector inputs suitable for submission to a deep-learning neural network, or as a triple-store that mathematically represents expert resource-requirement estimation knowledge as sets of rules, concepts, and relationships. Training system 4001 then, employing known methods of machine learning, uses machine-learning corpus to train machine-learning model 460 to associate a specific set of resource requirements with each workload represented by one of the histograms.

In other embodiments, training system 4000 applies additional intelligence to the data structures and knowledge developed in steps 500-550 to infer and associated resource requirements for additional histograms that are not directly related to a particular training workload. These additional histograms may be intelligently derived if, for example, the model identifies patterns and relationships among certain high-level characteristics represented by query vectors, certain types of resource requirements, or certain distributions of vectors associated with training workloads. The resulting additional histograms may be associated with resource requirements that are deduced or inferred from the patterns or relationships identified in the training workloads, even if the additional histograms do not precisely represent a particular training workload.

Steps 560-590 describe phases or embodiments of the present invention in which production DBMS 4000 applies the knowledge and experience incorporated into machine-learning model 460 through the training procedures of steps 500-550. This application comprises steps of batching incoming production data-access requests into production workloads and then estimating the resource requirements of each production workload by relating the distribution of high-level features of each production workload to knowledge of workload resource requirements learned during the training procedure. Further details of steps 560-590 are described in subsequent figures.

In step 560, DBMS 4000, while operating in a production environment, receives a set of data-access requests from users or from other computerized systems. DBMS 4000 may already be servicing other requests. Depending on implementation details, the data-access requests may comprise any sort of requests known in the art, such as SQL-formatted database queries.

In step 570, DBMS 4000 processes all or part of the set of received requests to generate a query vector for each processed request. This processing is performed in a manner similar to that of steps 510-520.

DBMS 4000 may use any known method preferred by an implementer to determine which requests are processed. For example, if step 570 performed whenever a certain condition is satisfied, DBMS 4000 may process all queries that have been received but not yet processed since the previous time the condition was satisfied. This condition can be set by a human administrator, manager, or programmer, or may be set and later adjusted through any known automated means. Examples of such conditions include: a detection that a certain duration of time has elapsed since the last performance of step 570; the occurrence of a certain time of day or day of the week; a detection that the number of unprocessed, queued queries has fallen below a threshold value or that the number of received, unqueued queries exceeds a threshold value; and a detection that available quantities of a certain combination of resources has exceeded a threshold value.

In other embodiments, DBMS 4000 may perform step 570 on a predetermined number of queries, choosing which queries to process as a function of the chronological order in which the queries are submitted or received. In yet other embodiments, a more sophisticated selection mechanism uses a combination of other factors, such as characteristics of each query, of each user or system submitting each query, or of the particular data storage being accessed by each query, to determine how many and which queries are selected for processing in step 570.

At the conclusion of step 570, DBMS 4000 will have generated a query vector for each data-access request selected from a subset of previously received incoming production data-access request.

In step 580, DBMS 4000 generates an optimal production workload by adding each processed query or other type of data-access request, one at a time, to DBMS 4000's existing workload. As with the methods for selecting which incoming data-access requests to process in step 570, the order in which the processed requests are added to the workload may be selected by any means preferred by an implementer. In some embodiments, this order is the chronological order in which incoming requests are submitted or received.

When each query is added, DBMS 4000, using knowledge and experience gained by building the machine-learning model 460 during the training phase, constructs a histogram that represents the distribution of templates among queries in the current workload. DBMS 4000 then estimates the resource requirements of the workload as a function of the resources associated with the newly identified histogram.

DBMS 4000 repeats this iterative procedure until the workload requires a greater quantity of a resource than is available. The most recently added statement is then removed from the workload. The resulting workload is then deemed to be the largest workload that DBMS 4000 can service without requiring unavailable resources.

In step 590, DBMS 4000 adds the selected workload to the query-execution queue, where each data-access request is serviced by DBMS components that access the data and indices of the database. These operations are, in some implementations, managed by the query execution engine 440 component of DBMS 4000.

In some embodiments, the results of processing the selected workload are returned to training system 4001 through the training pipeline 450. These results can include information like the internal composition of the selected workload, the histogram associated with the workload, the query vectors associated with each access request of the workload, or a comparison of the resource requirements specified by the histogram with the actual amounts of resources required to service the selected workload.

Figure 6:
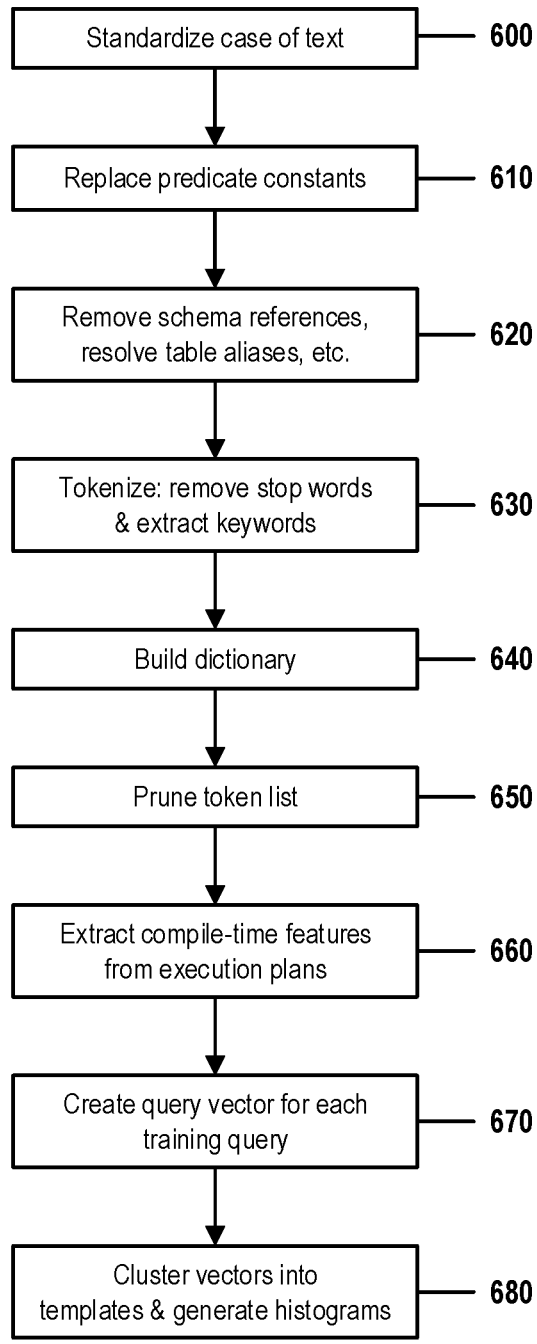
FIG. 6 is a flow chart showing steps for training DBMS system with self-learning binned resource optimization, in accordance with embodiments of the present invention.

FIG. 6 is a flow chart showing steps for training DBMS system with self-learning binned resource optimization, in accordance with embodiments of the present invention. FIG. 6 contains steps 600-680, which provide details of FIG. 5 steps 500-540.

In step 600, DBMS training system 4001 begins preprocessing the training queries (or other types of training data-access statements) received in step 500 of FIG. 5. One goal of these preprocessing steps is to force each training statement to comply with a common set of conventions or standards. This compliance reduces the number of unique characteristics of each statement that will be represented as elements of query vectors. Because the complexity of an embodiment increases with the size of the query vectors, reducing the number of vector elements improves an embodiment's efficiency and reduces its maintenance requirements.

This is especially true in embodiments where the resource-prediction model 460 is a deep neural network to which histograms and their associated aggregated resource requirements, or other data structures derived by an embodiment, are submitted as input. Because the size of a deep neural network increases rapidly with the number of elements in the network's vector input, a smaller input vector can significantly reduce model complexity.

In some embodiments, the first normalization step is to ensure that all statement text has a common case, such as upper-case or lower-case text. When a query language does not require statements to be case-sensitive, this step allows the training system 4001 to avoid errors in which, for example, the equivalent aliases "COL008" and "col008" are incorrectly assumed to be distinct tokens.

In step 610, training system 4001 replaces predicate constants in the training statements with markers in order to remove constants from further analysis in subsequent steps. This step further reduces complexity of an analysis, since the exact value of a constant has little if any effect on the amount or type of resources required to process a statement. For example, replacing the constant "21" in the clause "CustomerAge<21" with a marker prevents the exact value of the constant from being misidentified as a token element capable of altering the amount or type of resources required to execute the clause.

In step 620, training system 4001 continues preprocessing the training statements by removing from each statement other labels that do not affect the amount or type of resources required to execute the statement. These other labels include schema references and table aliases.

For example, because there is little if any difference in the amount or type of resources required to execute the query:
SELECT*FROM CustomerTable C1 WHERE C1.MyColumn>100
and the amount or type of resources required to execute the query:
SELECT*FROM CustomerTable C2 WHERE C2.MyColumn>100,
training system 4001 does not attempt to distinguish the table aliases "C1" and "C2" when determining the resource requirements of these statements.

In step 630, training statements preprocessed in steps 600-620 are tokenized in a manner analogous to tokenization steps used by known DBMS front-ends. This tokenization includes steps that extract syntactic keywords (such as the SQL predicate "JOIN") and semantic keywords (such as literal table names) and removes stop words like the SQL keywords "FROM" and "AND." As before, the keywords are identified because the keywords identify operations that consume significant amounts of resources, but the stop words are discarded because stop words do not incur resource utilization.

At the conclusion of step 630, training system 4001 will have accumulated lists of tokens extracted from the training statements after those statements have been standardized. This standardization can reduce the number of extracted tokens by removing from the statements elements that do not significantly affect resource requirements and to resolve ambiguities and redundancies capable of resulting in the misidentification of unnecessary additional tokens.

In step 640, training system 4001 builds a data dictionary that lists the number of occurrences of each distinct token extracted from the training statements in step 630.

In step 650, training system 4001 deletes from the data dictionary any tokens that do not occur at least a minimum number of times. This determination is performed by comparing the number of occurrences of each token to a predetermined minimum threshold value. This threshold value may be identified by any method preferred by an implementer, including known methods based on empirical observations of how various threshold levels affect performance of the method of FIG. 5, or through any method used by known DBMSs to generate data dictionaries during normal operation.

In step 660, training system 4001 reviews execution plans generated by query optimizer 420 (or a module that provides similar functionality) when processing the training statements. In some embodiments, these execution plans are included in the training dataset received in step 500. In other embodiments, a module of the DBMS 4000 or training system 4001 generates the execution plans through known methods similar to those performed by DBMS query optimizers 420. The resulting execution plans, and the detailed steps by which the plans are generated in order to instruct a DBMS how to most efficiently process a data-access request, are known in the field of database management.

Training system 4001 continues in this step by next extracting compile-time features from each training statement's execution plan. These high-level features, like the tokens extracted in step 630 from the training statements, are known in the field to be capable of incurring significant amounts of resource consumption during the execution of statements that comprise those features.

Examples of such high-level compile-time features, as known in the art, include operations to be performed and estimated metrics when a query would be executed, such as table scanning or sorting operations and cardinality estimation (for example, estimating the number of rows of a database table that must be traversed in order to perform operations like searching the table or joining a column of the table with another column).

Other examples of high-level features that may be identified by various types of embodiments as significantly affecting a statement's resource requirements include:
the maximum size of a sort heap available to the DBMS,
the number of aggregating operators in an SQL query, such as MAX( ), AVG( ), and COUNT( ),
the number of aggregating operators in an SQL query that include the SQL DISTINCT keyword,
the number of rows in a table that must be scanned before or after an operation can be performed, and
the number of threads available to a DBMS that is configured to multithread the execution of concurrent statement.

In step 670, a trained clustering model of training system 4001 assembles a query vector for each statement. Each element of each query vector uniquely corresponds to one of the high-level features identified in steps 610-650, such as a distinct token parsed from a training statement or a compile-time operation or metric referenced by a query-execution plan generated by a DBMS query-optimizer component. Each element of a query vector associated with a particular data-access statement associates the particular data-access statement a value of a high-level feature that corresponds to that element.

At the conclusion of step 670, each training statement will have been associated with a corresponding query vector that identifies high-level features, such as tokens and compile-time features, that characterize the statement. This vector does not identify low-level features associated with a corresponding training statement. It is possible for more than one training statement to be associated with an identical template, but no statement may be associated with more than one template.

In step 680, the clustering model of training system 4001 organizes the query vectors into clusters known as templates, divides the training dataset into workload subsets, and associates each workload with a histogram that identifies the distribution of query vectors among the training statements of that workload.

In this step, as previously described in FIG. 5, step 540, training system 4001 divides the training dataset into training workloads according to any criteria desired by an implementer. In certain embodiments and examples described in this document, statements or queries of the training dataset are allocated randomly into workloads that (other than a possible remainder workload that contains statements or queries that did not fit into any of the full workloads) each contain the same number of statements or queries.

The number of statements or queries in each training workload can also be selected by any means known in the art or preferred by an implementer. For example, in some embodiments the size of a training workload is chosen to optimize performance of the method of FIG. 6, where a total number of workloads, or a number of queries in each workload, has been determined empirically to provide optimal performance.

Trained model 460 of training system 4001 then characterizes each workload with a corresponding histogram. Each bin of the histogram identifies a number of queries or statements in the corresponding workload that are associated with a particular template. Because more than one query or statement may be associated with the same template, each bin may contain either a zero or a positive value. Each histogram is also associated with a set of resource requirements derived by adding the amounts of resources that were actually consumed by every training statement or query of the histogram's corresponding workload when those statements or queries were originally executed by DBMS 4000.

The method of FIG. 6 concludes, as described in FIG. 5, step 550, by using the resulting histograms, query vectors, and resource-consumption records to train an artificially intelligent model 460, such as a deep neural network, a deep-learning neural network, or another type of machine-learning model or expert system, to predict resource requirements for specific types of workloads.

Figure 7:
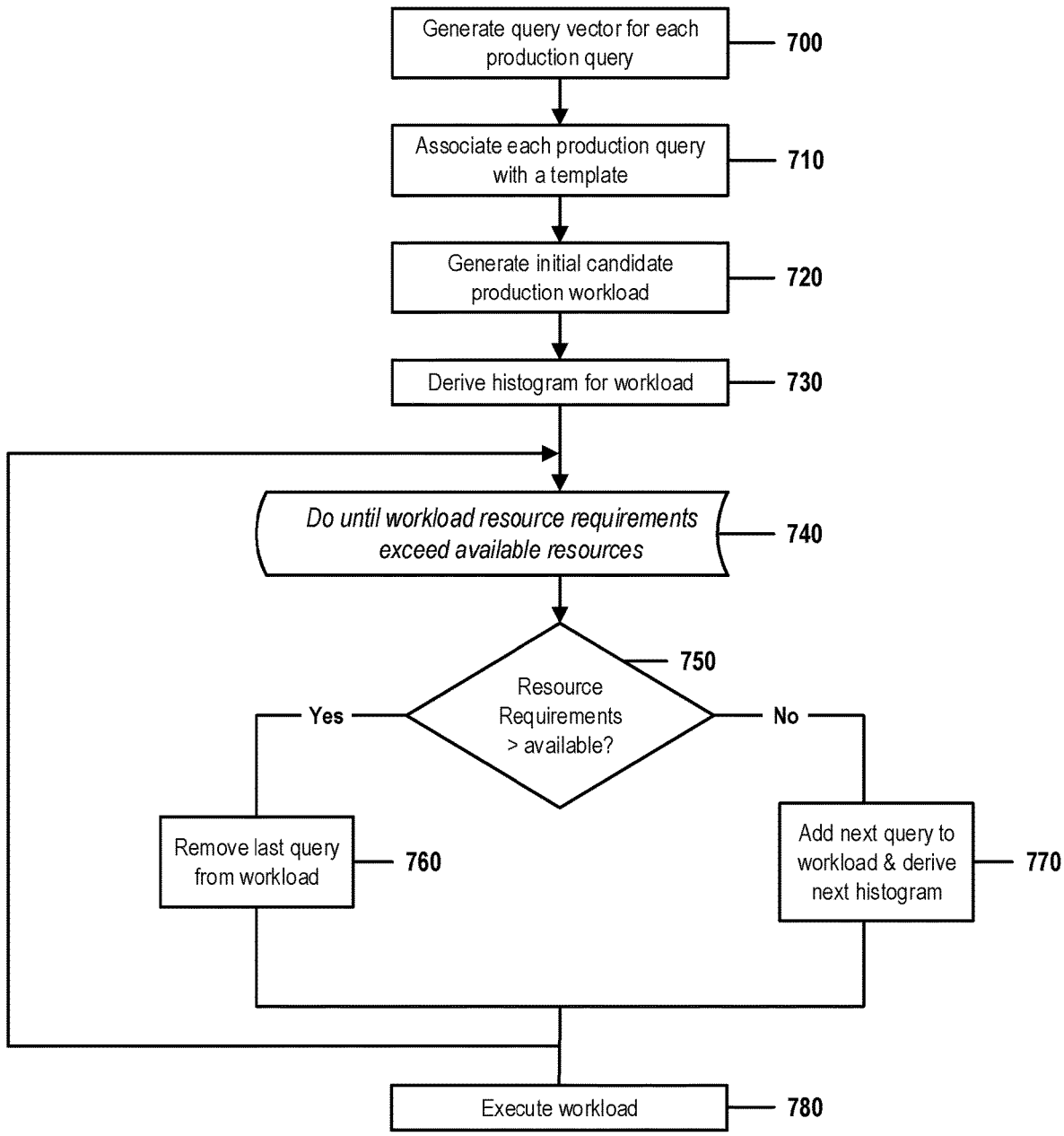
FIG. 7 is a flow chart showing steps for a DBMS system with self-learning binned resource optimization, in accordance with embodiments of the present invention.

FIG. 7 is a flow chart showing steps for a DBMS system with self-learning binned resource optimization, in accordance with embodiments of the present invention. FIG. 6 contains steps 600-680, which provide details of FIG. 5 steps 500-540. FIG. 7 contains steps 700-780, which provide details of steps 570-590 of FIG. 5.

FIG. 7 illustrates how an improved workload manager component 410 of a DBMS 4000 uses a machine-learning model 460, as trained by the method of FIG. 6 and steps 500-550 of FIG. 5, to estimate the resources required to execute production queries or other types of data-access requests. This method comprises steps of:
- dividing the incoming production queries into "production workload" subsets,
- associating each production workload with a matching histogram, where the matching histogram is structured in a manner similar to that of the training histograms derived by the methods of FIGS. 5 and 6, and then
- using knowledge gained by the model 460 during the training phase to infer the resource requirements of each production workload as a function of characteristics of the matching histogram.

In step 700, which is performed immediately after step 560 of FIG. 5, DBMS 4000 begins processing the set of incoming production queries (or data-access statements) received in step 560. This processing procedure is analogous to FIG. 5, steps 510-520, and FIG. 6, steps 610-670, as performed by training system 4001 upon the training dataset. At the conclusion of step 700, DBMS 400 will have generated a production query vector for at least a subset of the production queries or statements received in step 560.

In step 710, DBMS 400 associates each production query vector generated in step 700 with a template similar in form and function to those derived by training system 4001 during the training phase of FIGS. 5-6. This association may be performed by a clustering model developed and trained during the training phase, such as a model based on a k-means clustering algorithm.

In some embodiments, this process consists of a straightforward step of selecting templates containing vectors that match each of the production query vectors derived in step 700. If any of the production vectors cannot be matched to a template, some embodiments may use a similarity-quantizing algorithm to derive a template that identifies a closest-matching vector or that identifies a vector whose similarity to the production vector falls within a predefined tolerance level. Other embodiments may simply assign production vectors that have no matching templates to a reserved catch-all template like the template generated at the completion of step 530 of FIG. 5.

In step 720, DBMS 4000 assembles an initial production workload that contains a subset of the production queries processed in steps 700-720. If DBMS 4000 has not already finished executing all previously queued queries, this initial workload can, if preferred by an implementer, include one or more pending queries or statements currently in the execution queue in addition to or in place of the subset of production queries. In some embodiments, if DBMS 4000 is not currently executing any production queries, the initial workload is set to a single query (or statement, depending on implementation details) chosen from the production queries processed in steps 700-720.

In step 730, DBMS 4000 derives a histogram that identifies the distribution of templates associated with the initial workload. This step is performed by a procedure analogous to that used by training system 4001 in step 540 of FIG. 5 to generate a training histogram for each training workload.

Step 740 begins an iterative procedure of steps 740-770. This procedure repeats until the current candidate for production workload is determined to require resources in excess of the resources currently available to DBMS 4000.

In step 750, workload manager 410 (or another functional component of DBMS 4000) determines whether the current workload requires resources in excess of the resources currently available to DBMS 4000. This determination is made by comparing the resource requirements associated with the most recently selected or derived histogram with the types and amounts of resources currently available to DBMS 4000.

If the system determines that the current workload does not require resources in excess of those available, the method of FIG. 7 continues with step 770, which adds the next production query or statement to the current workload. As before, this next query or statement may be selected by any means desired by an implementer, such as by selecting as a function of the chronological order in which the production queries or statements were submitted or received by DBMS 4000.

DBMS 4000 repeats earlier steps to associate this updated workload with a histogram that represents the distribution of templates associated with the production statements contained by the updated workload. In embodiments that associate each template and histogram with only a single type of resource, or with only a proper subset of resource types, the updated workload in this step will be associated with a set of histograms that, in aggregate, represent distribution of templates associated with the aggregated resources, of all types, required to execute the aggregated workload. The newly derived histogram or histograms are derived by the model 460, based on prior training, so as to associate the updated workload with a specific set of resource requirements that will be compared, during the next iteration of step 750, to the quantities and types of resources currently available to DBMS 4000.

The iterative procedure of steps 740-770 then repeats, and this process continues until the production workload requires more resources than are currently available to DBMS 4000. At that point, the conditional step 750 directs the system to step 760, where the most recently added production statement or query is removed from the current workload. The final production workload is then selected as being the largest workload that can be executed by DBMS 4000 with only available resources. The iterative procedure of steps 740-770 then concludes and the method of FIG. 7 continues with step 780.

In step 780, DBMS 4000 executes the final production workload derived in step 760. This execution may be performed by means known in the art of database management. In certain embodiments, this execution procedure may be improved, however, by eliminating steps that check for the availability of resources required by the final production workload. These steps may, at the discretion of an implementer, be eliminated because it is known that the present invention has ensured that only available resources will be required to execute all queries, data-access requests, or other types of statements contained in the workload.

If any of the production statements processed in steps 700-710 have not yet been executed, steps 720-780 of FIG. 7 repeat with a next production workload selected from the remaining statements. As with the prior performance of these steps, DBMS 4000 generates a next candidate initial production workload, associates the candidate with one or more newly derived histograms, derived by the trained model 460 to be similar in form and function to the histograms generated by the method of FIGS. 5-6, and continues adding statements to the workload until the workload requires resources in excess of those available to DBMS 4000.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A training subsystem of a database-management system (DBMS) comprising a processor, a memory coupled to the processor, and a computer-readable hardware storage device coupled to the processor, the storage device containing program code configured to be run by the processor via the memory to implement a method for self-learning binned resource optimization for database management systems, the method comprising:

the training subsystem receiving training data comprising:
a set of training statements that each request access to a database managed by the DBMS, and
a record of the types and amounts of resources required by the DBMS to execute each statement of the set of training statements;

the subsystem generating a set of query vectors that each identify high-level characteristics of a corresponding statement of the training statements;

the subsystem allocating the set of query vectors to a set of templates,
where every vector of the set of query vectors is allocated to one template of the set of templates, and
where each template of the set of templates is populated with query vectors that have a degree of mathematical similarity to each other that exceeds a threshold degree of similarity;

the subsystem dividing the set of training statements into a set of training workloads,
where each workload of the training workloads is associated with a corresponding histogram,
where each bin of each corresponding histogram uniquely corresponds to one template of the set of templates, and
where each bin of a first corresponding histogram identifies how many statements, of the first corresponding histogram's corresponding workload, are associated with each template of the set of templates;

the subsystem associating each corresponding histogram with a set of resources consumed in the past by an execution of each training statement of the histogram's corresponding training workload;

the subsystem adding knowledge inferred from the training data into a training corpus capable of being used to train a machine-learning model; and the subsystem training a cognitive model of a workload-management component of the DBMS to predict resource requirements of batched data-access requests,
where the training comprises submitting the training corpus to the cognitive model, and
where the cognitive model predicts the types and amounts of production resources required by the DBMS by drawing inferences from a histogram, derived by the cognitive model, that associates the production workload with a distribution of production-workload templates of the set of templates, and with aggregated resource requirements associated with the histogram's production-workload templates.

2. The subsystem of claim 1, where each high-level characteristic of a first statement of the training statements is selected from the group consisting of:
a distinct token of a set of candidate tokens that can be parsed from the first statement; and
a distinct compile-time feature of the first statement that is identified by an execution plan generated by a DBMS optimizer component.

3. The subsystem of claim 2, further comprising:
identifying each occurrence, in the first statement, of a first token of the set of candidate tokens by preprocessing the first statement, where the preprocessing comprises:
converting all text of the first statement to either upper-case or lower case,
replacing all constants in predicates of the first statement with parameter markers,
deleting all schema references and table aliases from text of the first statement,
deleting all stop words from text of the first statement, and
parsing from the first statement a set of tokens that consist of all syntactic and semantic keywords contained in remaining text of the first statement.

4. The subsystem of claim 3, further comprising:
building a data dictionary that identifies a number of occurrences of each token parsed from the remaining text of any statement of the training statements;
expunging from the data dictionary any token associated with a number of occurrences that falls below a predefined threshold; and
defining the set of candidate tokens as being equivalent to all tokens remaining in the data dictionary after the expunging.

5. The subsystem of claim 1,
where training statements are allocated randomly to each training workload,
where no training statement is allocated to more than one training workload, and
where every training workload contains a same number of training statements.

6. The subsystem of claim 1, further comprising generating an empty template that does not correspond to any statement of the set of training statements.

7. The subsystem of claim 1, where a first vector of the set of query vectors is allocated to a first template of the set of templates only if a clustering algorithm determines that a magnitude of a distance, between a centroid point of the first template and a point located at coordinates specified by all elements of the first vector, is less than a predefined threshold value.

8. The subsystem of claim 7, where the clustering algorithm produces a clustering model capable of intelligently clustering query vectors into templates, and where the clustering algorithm is selected from the group consisting of: a k-means clustering algorithm, an Elbow method, and a DBSCAN algorithm.

9. The subsystem of claim 1, where each statement of the set of training statements is a data-access request that has been previously processed by the DBMS.

10. The subsystem of claim 1,
where the cognitive model is a neural network,
where the training further comprises training the neural network to predict types and amounts of production resources required by the DBMS to execute a production workload, and
where the production workload comprises a batch of production data-access requests.

11. The subsystem of claim 1,
where the cognitive model is a deep-learning neural network,
where the training corpus is a formally structured machine-learning corpus comprising a triple-store knowledgebase that represents the knowledge as sets of concepts, rules, and relations formatted into a triple-store data structure, and
where the knowledge comprises information selected from the group consisting of: each statement of the set of training statements, each vector of the set of query vectors, each template of the set of templates, each corresponding histogram, and each set of consumed resources associated with a corresponding histogram.

12. A method for self-learning binned resource optimization for database management systems, the method comprising:
a training subsystem of a database-management system (DBMS) receiving training data comprising:
a set of training statements that each request access to a database managed by the DBMS, and
a record of the types and amounts of resources required by the DBMS to execute each statement of the set of training statements;
the subsystem generating a set of query vectors that each identify high-level characteristics of a corresponding statement of the training statements;
the subsystem allocating the set of query vectors to a set of templates,
where every vector of the set of query vectors is allocated to one template of the set of templates, and
where each template of the set of templates is populated with query vectors that have a degree of mathematical similarity to each other that exceeds a threshold degree of similarity;
the subsystem dividing the set of training statements into a set of training workloads,
where each workload of the training workloads is associated with a corresponding histogram,
where each bin of each corresponding histogram uniquely corresponds to one template of the set of templates, and
where each bin of a first corresponding histogram identifies how many statements, of the first corresponding histogram's corresponding workload, are associated with each template of the set of templates;
the subsystem associating each corresponding histogram with a set of resources consumed in the past by an execution of each training statement of the histogram's corresponding training workload;
the subsystem adding knowledge inferred from the training data into a training corpus capable of being used to train a machine-learning model; and
the subsystem training a cognitive model of a workload-management component of the DBMS to predict resource requirements of batched data-access requests,
where the training comprises submitting the training corpus to the cognitive model, and
where the cognitive model predicts the types and amounts of production resources required by the DBMS by drawing inferences from a histogram, derived by the cognitive model, that associates the production workload with a distribution of production-workload templates of the set of templates, and with aggregated resource requirements associated with the histogram's production-workload templates.

13. The method of claim 12, where each high-level characteristic of a first statement of the training statements is selected from the group consisting of:
 a distinct token of a set of candidate tokens that can be parsed from the first statement; and
 a distinct compile-time feature of a set of compile-time features of the first statement that is identified by an execution plan generated by a DBMS optimizer component.

14. The method of claim 12,
 where training statements are allocated randomly to each training workload,
 where no training statement is allocated to more than one training workload, and
 where every training workload contains a same number of training statements.

15. The method of claim 12, further comprising providing at least one support service for at least one of creating, integrating, hosting, maintaining, and deploying computer-readable program code in the computer system, wherein the computer-readable program code in combination with the computer system is configured to implement the receiving, the generating, the allocating, the dividing, the associating, the adding, and the training.

16. A computer program product for self-learning binned resource optimization for database management systems (DBMSs), the computer program product comprising a computer readable storage medium having program instructions embodied therewith, the program instructions executable by a processor to cause the processor to perform a method for self-learning binned resource optimization for database management systems, the method comprising:
 a training subsystem of a database-management system (DBMS) receiving training data comprising:
  a set of training statements that each request access to a database managed by the DBMS, and
  a record of the types and amounts of resources required by the DBMS to execute each statement of the set of training statements;
 the subsystem generating a set of query vectors that each identify high-level characteristics of a corresponding statement of the training statements;
 the subsystem allocating the set of query vectors to a set of templates,
  where every vector of the set of query vectors is allocated to one template of the set of templates, and
  where each template of the set of templates is populated with query vectors that have a degree of mathematical similarity to each other that exceeds a threshold degree of similarity;
 the subsystem dividing the set of training statements into a set of training workloads,
  where each workload of the training workloads is associated with a corresponding histogram,
  where each bin of each corresponding histogram uniquely corresponds to one template of the set of templates, and
  where each bin of a first corresponding histogram identifies how many statements, of the first corresponding histogram's corresponding workload, are associated with each template of the set of templates;
 the subsystem associating each corresponding histogram with a set of resources consumed in the past by an execution of each training statement of the histogram's corresponding training workload;
 the subsystem adding knowledge inferred from the training data into a training corpus capable of being used to train a machine-learning model; and
 the subsystem training a cognitive model of a workload-management component of the DBMS to predict resource requirements of batched data-access requests,
  where the training comprises submitting the training corpus to the cognitive model, and
  where the cognitive model predicts the types and amounts of production resources required by the DBMS by drawing inferences from a histogram, derived by the cognitive model, that associates the production workload with a distribution of production-workload templates of the set of templates, and with aggregated resource requirements associated with the histogram's production-workload templates.

17. The computer program product of claim 16, where each high-level characteristic of a first statement of the training statements is selected from the group consisting of:
 a distinct token of a set of candidate tokens that can be parsed from the first statement; and
 a distinct compile-time feature of the first statement that is identified by an execution plan generated by a DBMS optimizer component.

18. The computer program product of claim 16,
 where training statements are allocated randomly to each training workload,
 where no training statement is allocated to more than one training workload, and
 where every training workload contains a same number of training statements.

19. A database-management (DBMS) system comprising a processor, a memory coupled to the processor, and a computer-readable hardware storage device coupled to the processor, the storage device containing program code configured to be run by the processor via the memory to implement a method for self-learning binned resource optimization for database management systems, the method comprising:
 the DBMS receiving a set of production statements, which each request access to a database managed by the DBMS, and a cognitive model trained to predict resource requirements of batched data-access requests,
  where the cognitive model is trained by submitting a training corpus to the cognitive model, and
  where the cognitive model predicts types and amounts of production resources required by the DBMS by drawing inferences from a histogram, derived by the neural network, that associates the production workload with a distribution of production-workload templates of the set of templates, and with aggregated resource requirements associated with the histogram's production-workload templates;
 the DBMS generating a set of query vectors,
  where each vector of the set of query vectors identifies high-level characteristics of a corresponding statement of the set of production statements, and
  where each element of a particular vector of the set of query vectors identifies a distinct high-level characteristic of a corresponding statement of the set of production statements;

the DBMS allocating each vector of the set of query vectors to a corresponding template of a set of model templates maintained by a clustering model of the cognitive model;

the DBMS iteratively generating a final production workload, where each iteration comprises the steps:

the DBMS adding a next statement selected from the set of production statements to a candidate production workload, where the next statement has not previously been added to the candidate production workload, the DBMS attempting to associate the candidate production workload with a candidate histogram, where each bin of the candidate histogram identifies a total number of statements of the candidate production workload associated with a template, of the set of model templates, uniquely assigned to that bin;

the DBMS, if able to associate the candidate production workload with the candidate histogram, predicting as a function of the cognitive model's training that executing the candidate production workload would require quantities and types of resources equal to those resources identified by the cognitive model, as a function of the cognitive model's training, as being incurred by executing any workload characterized by the matching histogram, the DBMS, if determining that executing the candidate production workload would require more resources than are currently available to the DBMS, deleting the most recently added statement from the candidate production workload and deeming the resulting workload to be the final production workload, and the DBMS, if determining that executing the candidate production workload would not require more resources than are currently available, continuing with a next iteration of the generating a final production workload; and the DBMS forwarding the final production workload to a query execution engine of the DBMS for execution by the DBMS.

20. The DBMS of claim 19, further comprising:
the DBMS, if unable to derive a matching histogram,
identifying to the cognitive model the candidate production workload, the most recently added statement, and the candidate histogram,
deleting the most recently added statement from the candidate production workload, and
continuing with a next iteration of the generating a final production workload.

21. The DBMS of claim 19,
where each template of the set of model templates identifies a corresponding cluster of query vectors, and
where a first vector is allocated to a particular template of the set of model templates if a magnitude of a distance between:
i) a centroid point of all vectors identified by the particular template and
ii) a point located at coordinates specified by the first vector is no greater than a predefined threshold value.

22. The DBMS of claim 19, where each high-level characteristic of a first statement of the production statements is selected from the group consisting of:
a distinct token that can be parsed from the first statement; and
a distinct compile-time feature of the first statement that is identified by an execution plan generated by an optimizer component of the DBMS.

23. The DBMS of claim 19, where the candidate production workload is initialized, prior to a first iteration of the generating a final production workload, to a set of initial-workload claims that include at least one pending data-access request queued for execution by the DBMS.

24. A method comprising:
a production database-management (DBMS) system receiving a set of production statements, which each request access to a database managed by the DBMS, and a cognitive model trained to predict resource requirements of batched data-access requests;

the DBMS generating a set of query vectors,
where each vector of the set of query vectors identifies high-level characteristics of a corresponding statement of the set of production statements, and
where each element of a particular vector of the set of query vectors identifies a distinct high-level characteristic of a corresponding statement of the set of production statements;

the DBMS allocating each vector of the set of query vectors to a corresponding template of a set of model templates maintained by a clustering model of the cognitive model;

the DBMS iteratively generating a final production workload, where each iteration comprises the steps:

the DBMS adding a next statement selected from the set of production statements to a candidate production workload, where the next statement has not previously been added to the candidate production workload;

the DBMS attempting to associate the candidate production workload with a candidate histogram, where each bin of the candidate histogram identifies a total number of statements of the candidate production workload associated with a template, of the set of model templates, uniquely assigned to that bin;

the DBMS, if able to associate the candidate production workload with the candidate histogram, predicting as a function of the cognitive model's training that executing the candidate production workload would require quantities and types of resources equal to those resources identified by the cognitive model, as a function of the cognitive model's training, as being incurred by executing any workload characterized by the matching histogram, where the cognitive model predicts the types and amounts of production resources required by the DBMS by drawing inferences from a histogram, derived by the cognitive model, that associates the production workload with a distribution of production-workload templates of the set of templates, and with aggregated resource requirements associated with the histogram's production-workload templates;

the DBMS, if able to derive a matching histogram, predicting that executing the candidate production workload would require quantities and types of resources equal to those resources identified by the cognitive model, as a function of the cognitive model's training, as being incurred by executing any workload characterized by the matching histogram;

the DBMS, if determining that executing the candidate production workload would require more resources than are currently available to the DBMS, deleting the most recently added statement from the candidate production workload and deeming the resulting workload to be the final production workload; and the DBMS, if determining that executing the candidate production workload would not require more resources than are currently available, continuing with a next iteration of the generating a final production workload; and the DBMS forwarding the final production workload to a query execution engine of the DBMS for execution by the DBMS.

25. The method of claim 24, where each template of the set of model templates identifies a corresponding template comprising a cluster of query vectors, and where a first vector is allocated to a particular template of the set of model templates if a magnitude of a distance between:
  i) a centroid point of all vectors identified by the particular template and
  ii) a point located at coordinates specified by the first vector is no greater than a predefined threshold value.

* * * * *